J. G. BRADY.
TROLLEY GUIDE.
APPLICATION FILED NOV. 8, 1920.
1,371,294. Patented Mar. 15, 1921.
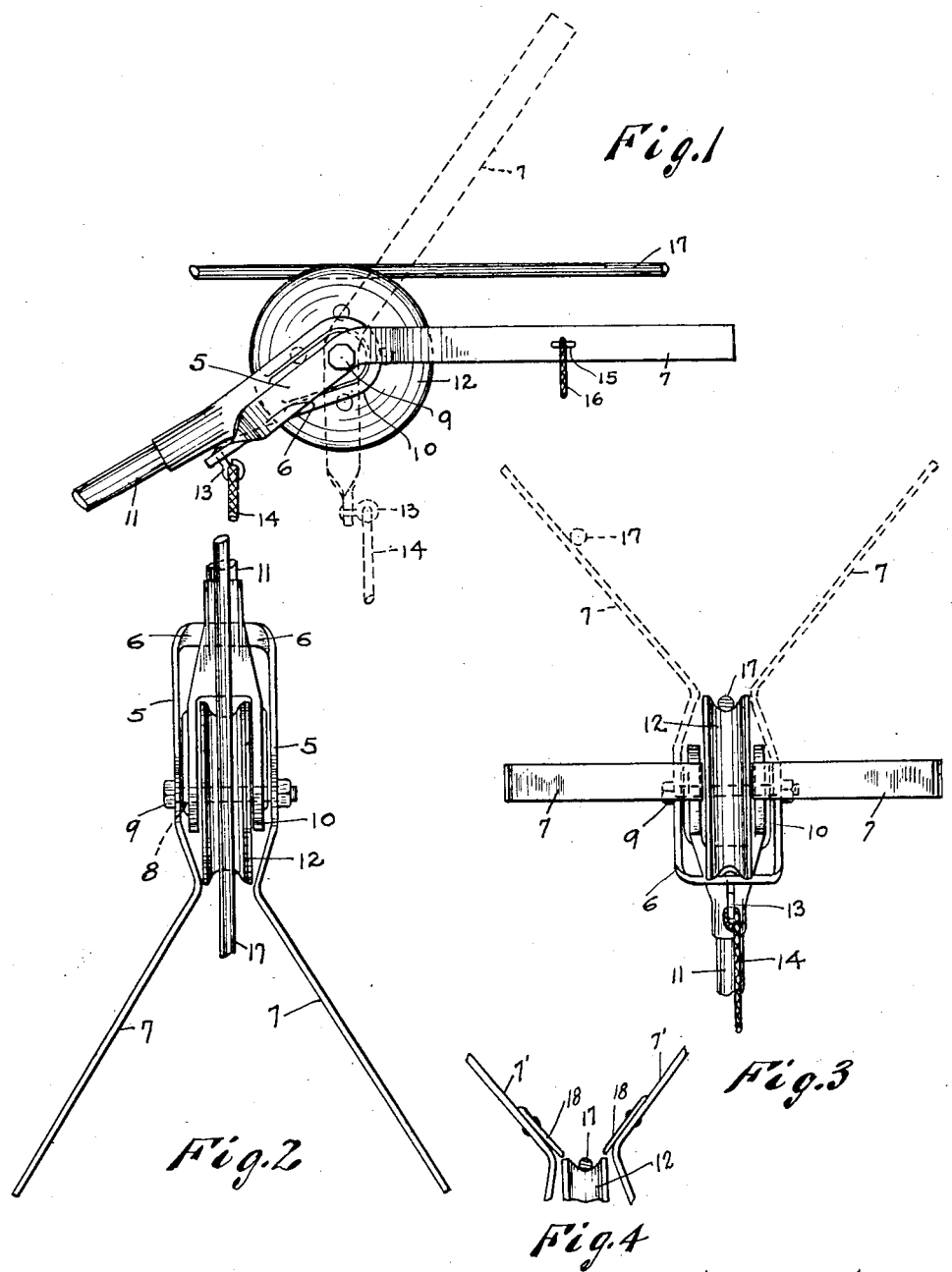
Witnesses:
Inventor
James G. Brady
By His Attorney

UNITED STATES PATENT OFFICE.

JAMES G. BRADY, OF CHICAGO, ILLINOIS.

TROLLEY-GUIDE.

1,371,294.    Specification of Letters Patent.    Patented Mar. 15, 1921.

Application filed November 8, 1920. Serial No. 422,528.

*To all whom it may concern:*

Be it known that I, JAMES G. BRADY, a citizen of the United States, and a resident of the city of Chicago, county of Cook, and State of Illinois, have invented a new and useful Trolley-Guide, of which the following is a specification.

My invention relates to a trolley guide, and has for its object the provision of means whereby the trolley wheel of a street car or the like may be readily guided toward the trolley wire, and may be quickly brought in contact therewith.

It has been found that difficulty is frequently experienced in bringing the trolley wheel of a street car or the like into operative contact with the overhead trolley wire, especially is this true on a dark night. It is the main object of this invention to obviate this difficulty, and provide means which will assure the quick and accurate guiding of the trolley wheel into operative contact with the trolley wire.

An illustrative embodiment of the invention is shown in the accompanying drawing, in which:

Figure 1 is a side elevation of the device, showing in full lines the normal position of the guide member, and in dotted lines the operative or active position thereof.

Fig. 2 is a plan view of the device.

Fig. 3 is an end view thereof, showing in dotted lines the guide arms in elevated or operative position guiding the trolley wheel toward the trolley wire.

Fig. 4 shows a modified form of guide arm.

Similar numerals refer to similar parts throughout the several views.

The guide member 5 consists of a yoke 6 branching out into two outwardly extending side arms 7. This guide member 5 is provided with opening 8 in the yoke part 6, by means of which it is pivotally mounted on a bolt or pin 9, which may be the usual trolley wheel pivot pin, and which passes through the upper end 10 of the trolley pole 11 and through the trolley wheel 12. A hook 13 is connected to the bight of the yoke 6 for the attachment of the usual trolley rope or cable 14 thereto. An eye 15 is connected to the outside of one of the arms 7, for the attachment of a cord or cable 16, by means of which the guide arms of the guide member may be positively held downward, and the trolley wheel with said guide member held down and out of contact from an overhead viaduct or bridge construction beneath which the trolley car may be passing.

In Fig. 4 the guide arms 7' are shown supplied with guard plates 18 to positively prevent the trolley wire from getting between an arm and the trolley wheel.

In operation it is merely necessary to hold the trolley rope, and therewith direct the pole end and trolley wheel toward the trolley wire 17, during which operation the yoke of the guide member will be drawn downwardly and the guide arms forced upwardly. Whereupon the guide arms, by means of their diverging construction, will readily and surely gather the trolley wire between their ends and accurately guide the trolley wheel into proper operative position onto the trolley wire.

It is my intention to cover all such modifications and variations as may be reasonably included within the scope of my claims.

I claim as my invention:

1. A trolley wheel guide comprising a guide member, and means on said guide member for positively holding the same in an inoperative position.

2. A trolley wheel guide comprising a guide member, and manually operable means on said guide member for positively holding the same in an inoperative position.

3. A trolley wheel guide comprising a pivoted guide member, means on said member for holding the same in an inoperative position, and a cable attached to said member for positively holding the same in an inoperative position.

4. A trolley wheel guide comprising two diverging guide arms, means on said guide for mounting the same on the trolley wheel pivot pin and manually operable means on said guide arms for positively holding the same in an inoperative position.

5. A trolley wheel guide comprising a yoke member and two diverging arms extending from said member, said member having openings therein for mounting said guide on the trolley wheel pivot pin, means on said member for holding said guide in an operative position for guiding said trolley wheel toward the trolley wire, and a cable attached to said guide for positively holding said guide in an inoperative position.

In testimony whereof I have signed my name to this specification in the presence of two subscribing witnesses.

JAMES G. BRADY.

Witnesses:
 JOSHUA R. H. POTTS,
 CLARENCE E. THREEDY.